United States Patent
Joo et al.

(10) Patent No.: US 7,571,456 B1
(45) Date of Patent: Aug. 4, 2009

(54) DOWNLOADING APPARATUS AND METHOD THEROF FOR DIGITAL BROADCAST RECEIVER

(75) Inventors: Kwang Cheol Joo, Kumi (KR); Kuk Ho Bae, Kumi (KR); In Hun Kim, Daeku (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/053,650

(22) Filed: Apr. 2, 1998

(30) Foreign Application Priority Data

Apr. 14, 1997 (KR) ................... 97-13657
Dec. 19, 1997 (KR) ................... 97-70750

(51) Int. Cl.
*G06F 15/16* (2006.01)
*H04L 9/08* (2006.01)
*G06F 13/00* (2006.01)

(52) U.S. Cl. .............. 725/132; 725/50; 725/140; 725/152; 713/2; 714/2; 714/748

(58) Field of Classification Search ........ 725/132, 725/50, 140, 152, 35; 713/1–2, 100
See application file for complete search history.

(56) References Cited

U.S. PATENT DOCUMENTS

| | | | |
|---|---|---|---|
| 4,525,865 A | | 6/1985 | Mears |
| 5,440,632 A * | | 8/1995 | Bacon et al. ............ 725/132 |
| 5,585,866 A | | 12/1996 | Miller et al. |
| 5,666,293 A * | | 9/1997 | Metz et al. ............. 725/132 |
| 5,732,275 A * | | 3/1998 | Kullick et al. .......... 717/170 |
| 5,768,539 A * | | 6/1998 | Metz et al. ............. 725/132 |
| 5,790,753 A * | | 8/1998 | Krishnamoorty et al. ... 725/132 |
| 5,790,783 A * | | 8/1998 | Lee et al. ............... 726/20 |
| 5,894,516 A * | | 4/1999 | Brandenburg et al. ..... 725/132 |
| 5,978,911 A * | | 11/1999 | Knox et al. ............. 713/1 |
| 6,006,034 A * | | 12/1999 | Heath et al. ............ 717/170 |
| 6,230,319 B1 * | | 5/2001 | Britt et al. ............. 717/173 |
| 6,341,373 B1 * | | 1/2002 | Shaw ................... 717/173 |
| 6,360,366 B1 * | | 3/2002 | Heath et al. ............ 717/178 |
| 6,381,694 B1 * | | 4/2002 | Yen .................... 713/2 |

(Continued)

FOREIGN PATENT DOCUMENTS

EP     0 562 186 A1     3/1992

(Continued)

OTHER PUBLICATIONS

Hans Engelkamp, "System-Konzept einer Set-Top-Box," 1995, pp. 36-39.

(Continued)

*Primary Examiner*—Christopher Kelley
*Assistant Examiner*—Reuben M Brown
(74) *Attorney, Agent, or Firm*—Finnegan, Henderson, Farabow, Garrett & Dunner, L.L.P.

(57) ABSTRACT

A downloading apparatus and method for a digital broadcast receiver which updates a control program of an associated microcontroller with a control program received in a broadcast signal. The downloading apparatus examines the control program prior to initializing the microcontroller, and a new control program is downloaded if the examined control program is incomplete. The downloading apparatus also has a backup memory for abnormal events when downloading. A control program stored in the backup memory enables completion of the downloading.

5 Claims, 6 Drawing Sheets

U.S. PATENT DOCUMENTS

| | | |
|---|---|---|
| 6,535,976 B1 * | 3/2003 | Hoggarth et al. ............... 713/2 |
| 6,553,490 B1 * | 4/2003 | Kottapurath et al. ........... 713/2 |
| 6,622,246 B1 * | 9/2003 | Biondi ....................... 713/100 |
| 2001/0056532 A1 * | 12/2001 | Cooper ......................... 713/2 |

FOREIGN PATENT DOCUMENTS

| | | |
|---|---|---|
| EP | 0 723 372 A2 | 7/1996 |
| EP | 0 735 764 A1 | 10/1996 |
| GB | 2 288 044 A | 10/1995 |
| WO | 96/41472 | 12/1996 |
| WO | WO 94/41472 | 12/1996 |
| WO | WO 96/41472 | 12/1996 |

OTHER PUBLICATIONS

English language translation of Hans Engelkamp, "System-Konzept einer Set-Top-Box," 1995.

* cited by examiner

DOWNLOADING APPARATUS AND METHOD THEROF FOR DIGITAL BROADCAST RECEIVER

BACKGROUND OF THE INVENTION

1. Field of the Invention

The present invention relates to a digital broadcast receiver, and more particularly to a downloading apparatus and a method thereof for a digital broadcast receiver, capable of downloading programs of a microcomputer.

2. Discussion of the Background

Currently, most digital broadcast systems obey a MPEG standard, and a MPEGII system for broadcasts is divided into sections of a system, a video and an audio standard.

Among them, the system standard is to prescribe a time-multiplexed signal stream called a transport stream packet. There is a header at a start section of the transport stream packet, and packet identifier (PID) numbers indicating header. The PID numbers which provide essential information for inverse multiplexing of time-multiplexed signal streams are identifying numbers indicating whether a current packet is a video, an audio or an additional information packet.

The video and audio standards for visual and audio signal streams which are respectively compressed by the MPEGII system. These signal streams are divided by the PIN numbers, and video, audio and additional information become time-multiplexed and transmitted through several transport stream packets.

FIG. 1 is a block diagram of a general digital broadcast receiver for a TV.

As shown therein, the general digital broadcast receiver is provided with: a link unit 100 for detecting and correcting a quadrature phase shift keying (QPSK) signal or a quadrature and amplitude modulation (QAM) signal, which is inputted through an antenna ANT, for thereby outputting a transport signal stream; a system decoder 110 for performing inverse-multiplexing of the transport signal stream from the link unit 100, that is for dividing the transport signal stream from the link unit 100 into video, audio and additional information signal streams; a video decoder 120 for expanding the video signal stream divided by the system decoder 110; an audio decoder 140 for expanding the audio signal stream divided by the system decoder 110; an encoder 130 for converting the video signal from the video decoder 120 to a luminance signal Y and a chrominance signal C to be displayed on a TV or a monitor; a D/A converter 150 for converting the digital audio signal from the audio decoder 140 to an analog audio signal; a microcomputer 160 for controlling functions of the additional information signal stream separated by the system decoder 110 or additional information supplied from a user interface 190; a ROM 170 for storing a main program for driving the microcomputer 160; a RAM 180 for temporarily storing variables for an operation of the microcomputer 160; and a data bus and an address bus for receiving and transmitting data and address in each unit.

FIG. 2 illustrating a map of the ROM 170 in FIG. 1. As shown therein when power is applied to the ROM 170, the main program is instantly processed.

Now, an operation of the general digital broadcast receiver will be describe with reference to the accompanying drawings.

The link unit 100 detects and corrects the QPSK or QAM signal from the antenna ANT and outputs a resultant transport signal stream to the system decoder 110.

The system decoder 110 which receives the transport signal stream detects the PID numbers, that is inverse-multiplexing, for thus dividing into the video, audio and additional signal streams, and applies the video signal stream to the video decoder 120, the audio signal stream to the audio decoder 140 and the additional information stream to the microcomputer 160, respectively.

The video decoder 120 expands the video signal stream which is compressed by the MPEGII, and the encoder 130 converts the video signal from the video decoder 120 to the luminance signal Y and the chrominance signal C to be displayed on the TV or the monitor.

While, the audio decoder 140 expands the audio signal stream which is also compressed by the MPEGII, and the D/A converter 150 converts the digital audio signal supplied from the audio decoder 140 to an analog audio signal.

The microcomputer 160 performs a control operation in accordance with the main program stored in the ROM 170 in order to carry out a function which corresponds to the additional information signal from the user interface 190 such as a remote control, a function key, etc. Here, the variables which are required for the operation of the main program are reserved in the RAM 180 and used whenever necessary.

However, when changing the main program stored in the microcomputer 160 in the digital broadcast receiver of the TV, for example, in a case of updating the program to receive any additional function or service, or changing the program due to discovery of bug therein, it is required to change the whole ROM in the digital broadcast receiver, which is troublesome to the TV user.

SUMMARY OF THE INVENTION

Accordingly, the present invention is directed to a digital broadcast receiver that obviates the problem due to the related art.

A first object of the present invention is to provide a downloading apparatus for a digital broadcast receiver and a method thereof for a digital broadcast receiver that updates a main program of a microcomputer by broadcast.

A second object of the present invention is to provide a downloading apparatus for a digital broadcast receiver and a method thereof for a digital broadcast receiver that examines a main program before performing initializing a system, thus a downloading mode is automatically selected when an incomplete main program is stored.

A third object of the present invention is to provide a downloading apparatus for a digital broadcast receiver and a method thereof for a digital broadcast receiver that has a back-up memory for cases where power is off in the process of program downloading operation or an abnormal state occurs due to an unstable signal, for thereby safely performing the program downloading operation.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a downloading apparatus for a digital broadcast receiver according to a first embodiment includes; and a receiver which receives a broadcast signal having a video program signal and a control informal signal; a storage element which stores a control program, the control program controlling the operation of a video program corresponding to the video program signal; and a micro-controller which updates the control program in the storage element based on the control information signal.

It is to be understood that both the foregoing general description and the following detailed description are exemplary and explanatory and are intended to provide and further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Figure 1:
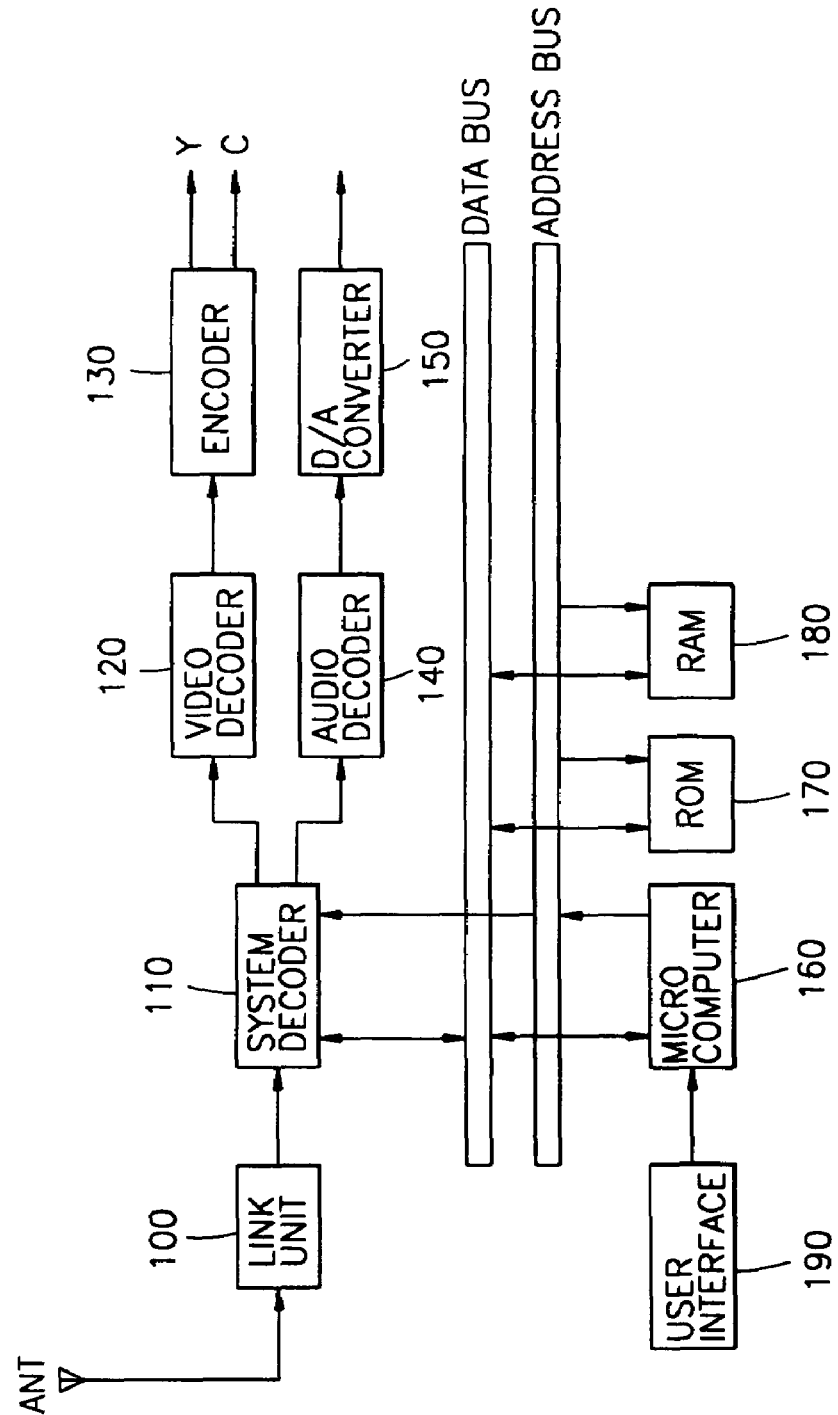
FIG. 1 is a block diagram of a conventional digital broadcast receiver.
Figure 2:
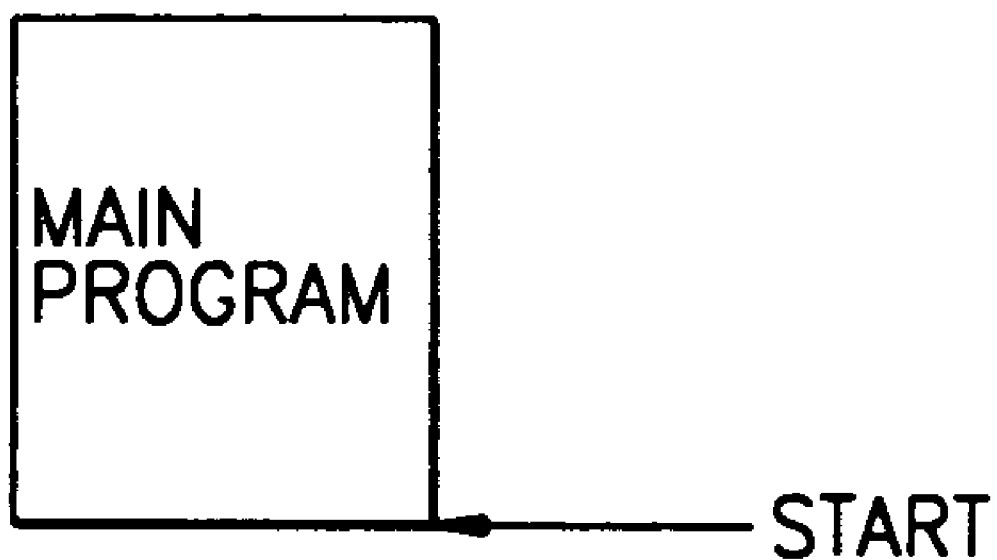
FIG. 2 is a map of a ROM in FIG. 1.
Figure 3:
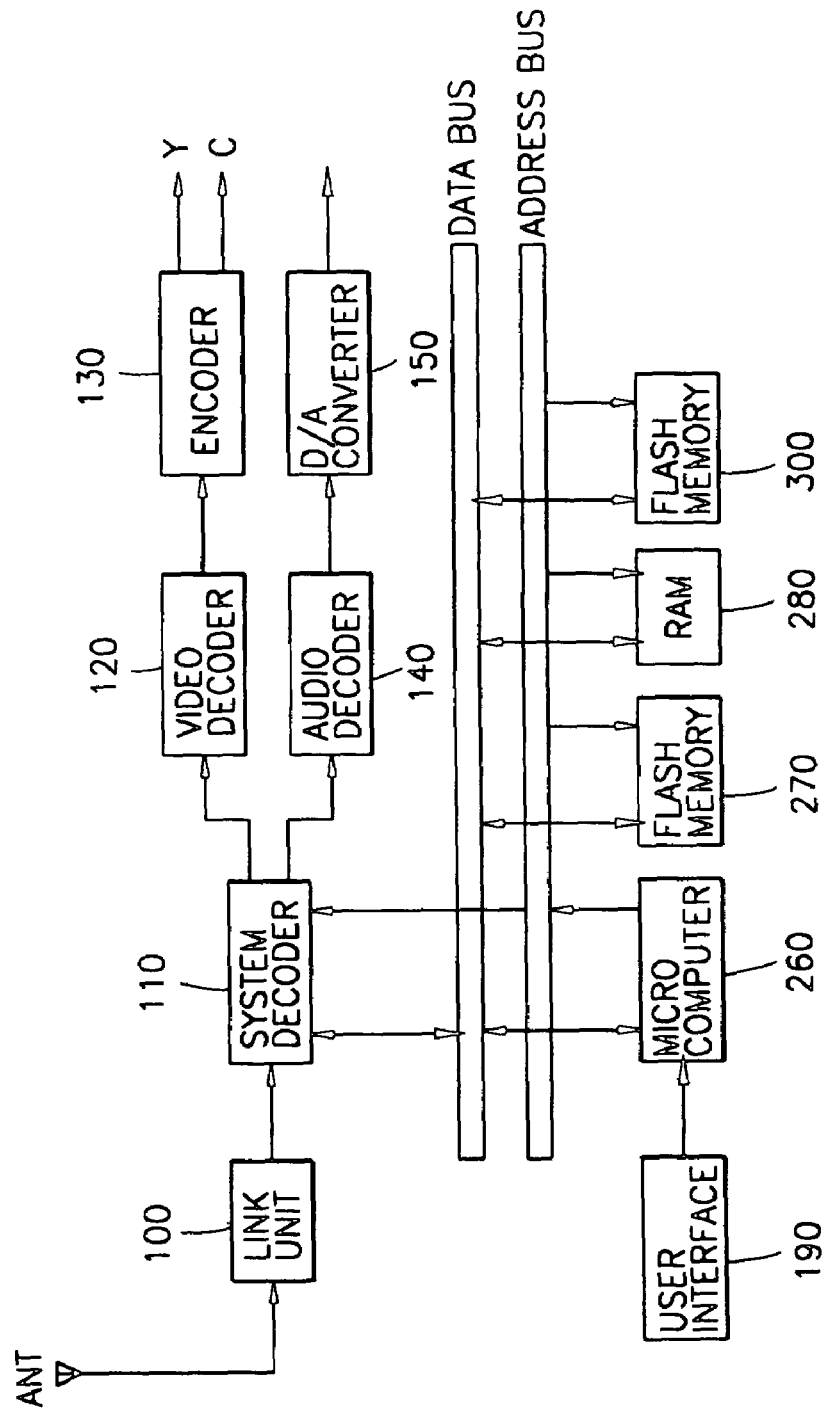
FIG. 3 is a block diagram of a digital broadcast receiver according to the present invention.

FIG. 3 is a block diagram of a digital broadcast receiver according to a preferable embodiment of the present invention.

As shown therein, a downloading apparatus for a digital broadcast receiver according to the present invention includes a microcomputer 260 for controlling an overall operation of a system to initialize the system and carry out a bootstrap and a downloading processes, a RAM 280 for temporarily storing a new main program transmitted from a system decoder 110 in a down mode in accordance with the control of the microcomputer 260, and a flash memory 270 for storing main, bootstrap and downloading programs in accordance with the control of the microcomputer 260.

The elements which are the same as those of the conventional art are labelled with the same reference numbers, and the description thereof will be omitted.

Figure 4:
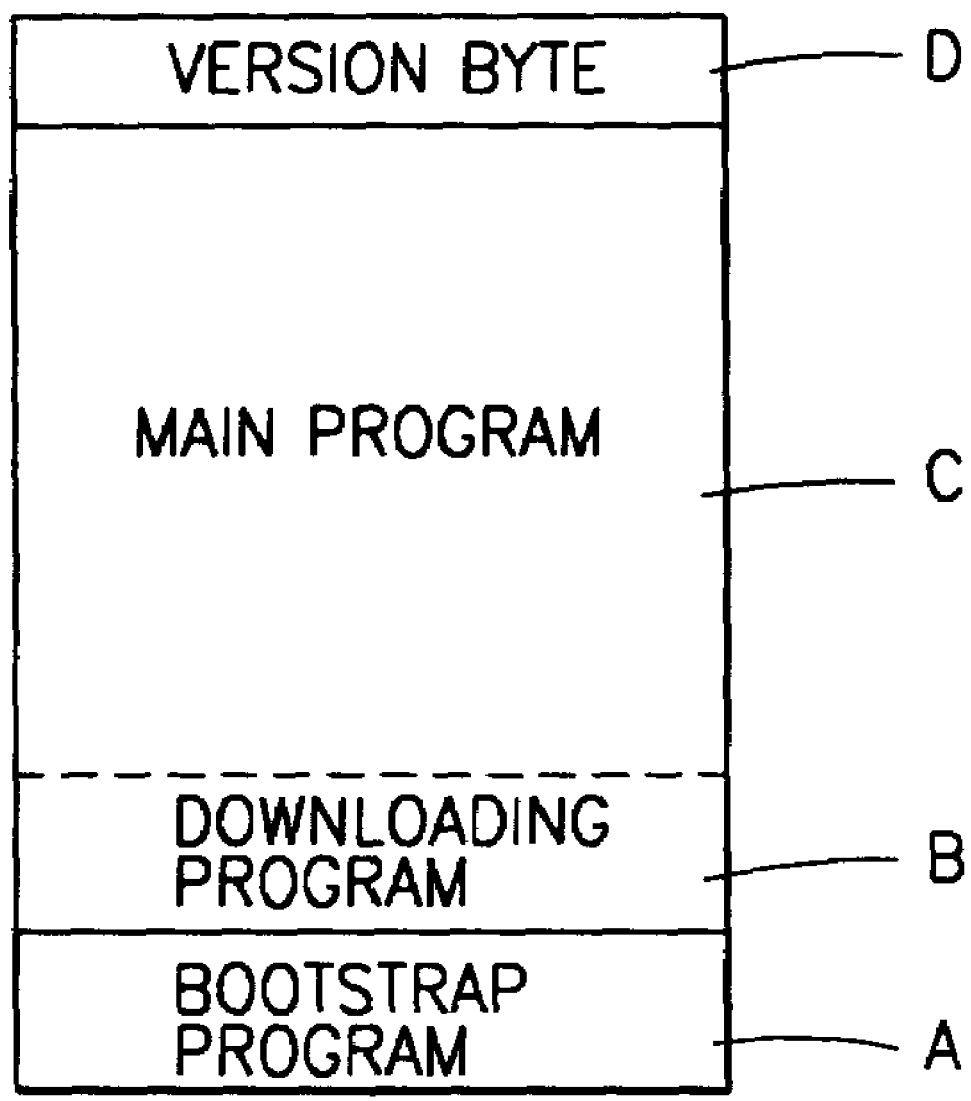
FIG. 4 is a map of a flash memory according to a preferable embodiment of the present invention.

FIG. 4 illsutrates a map construction of the flash memory 270 in FIG. 3, provided with four domains storing a bootstrap program A, a downloading program B, a main program C and a version byte D.

Now, a downloading operation of the downloading apparatus for the digital broadcast receiver according to a first embodiment of the present invention will be described.

Figure 5:
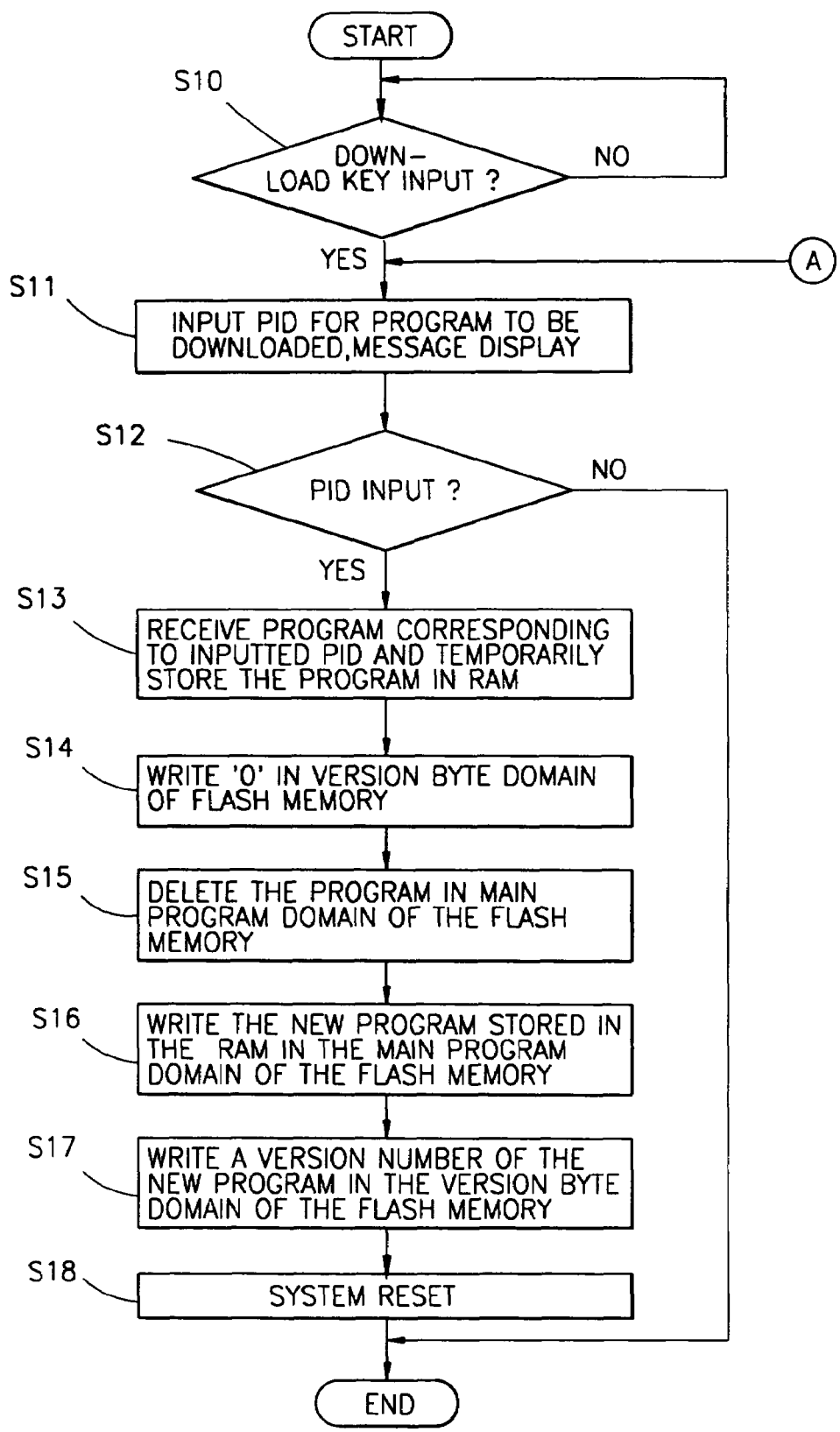
FIG. 5 is a flowchart of a downloading process of a digital broadcast receiver according to a first embodiment of the present invention.

In FIG. 5, when a system user inputs a key for the downloading operation through the user interface 190, the microcomputer 260 recognizes the key input (S10) and starts the downloading program B which is stored in the flash memory 270.

First, a message is displayed on a screen, instructing the user to input a PID number of a new main program to be downloaded (S11), on the assumption that the user knows the PID numbers.

When the user inputs the PID number of a specific program through the user interface 190 (S12), the microcomputer 260 temporarily stores packet data, corresponding to the input PID number which are transmitted from the system decoder 110, in the RAM 280 (S13).

A version number '0' is written in the version byte domain D of the flash memory 270 (S14), and the main program C in the flash memory is removed (S15). The version number '0' indicates that the main program which has been stored in the flash memory 270 is deleted and a new program is downloaded. Thus, when the downloading operation is completed, a version number of a new program is written.

Next, the new main program which has been temporarily stored in the RAM 280 is written in the main program domain C (S16), and a corresponding version number thereto is re-written in the version byte domain D (S17).

Lastly, when the main program is updated, a system initialization is performed by which the whole system is reset in accordance with the new main program (S18), and then various functions required by the user may be carried out.

Figure 6:
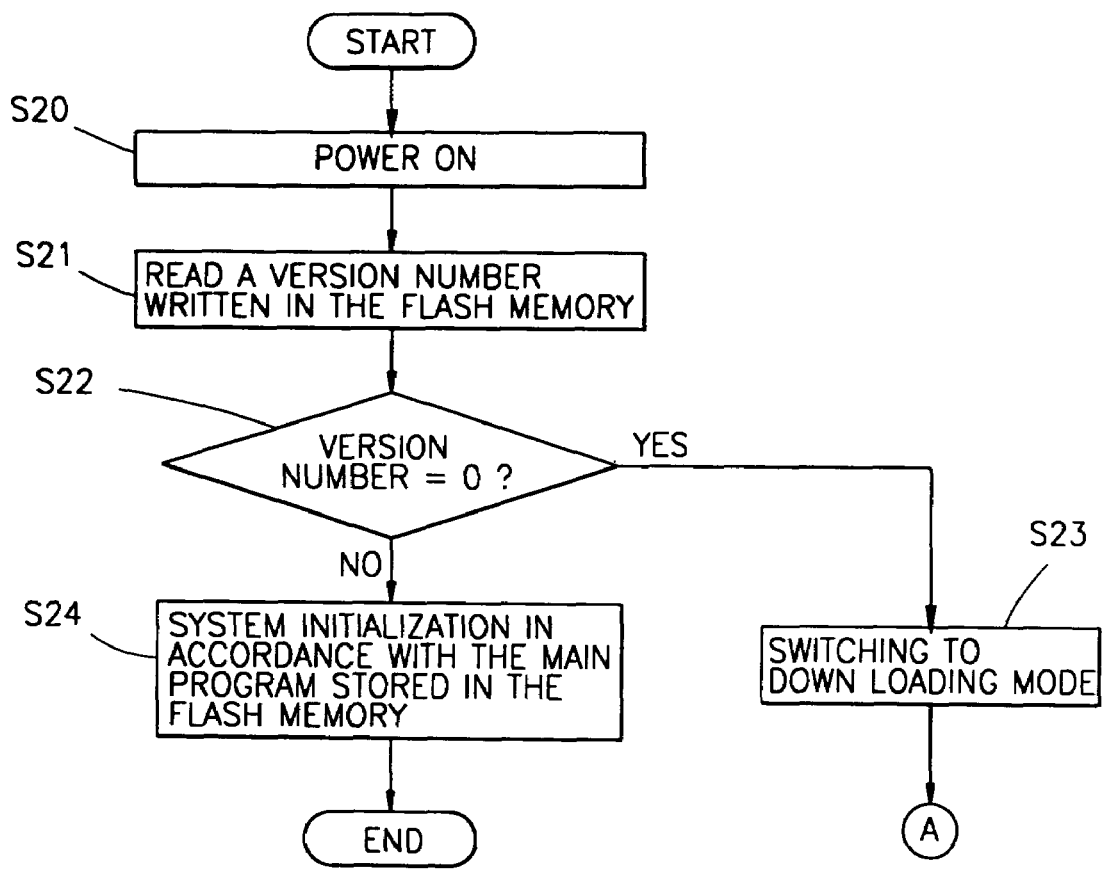
FIG. 6 is a flowchart of a downloading process of a digital broadcast receiver according to a second embodiment of the present invention.

However, when the downloading operation is suspended due to power failure or signal transmission error while deleting the main program C in the flash memory 270 and re-writing the new program in the downloading process, that is during S14 to S16, there may occur erroneous program operation since the main program which has been stored and the new program is incomplete. FIG. 6 illustrates a downloading process of a downloading apparatus for a digital broadcast receiver according to a second embodiment of the present invention in order to make up for such problem due to the first embodiment of the present invention.

When power of a system is on (S20), the microcomputer 260 recognizes a version number of the version byte domain D in the flash memory 270 by firstly processing the bootstrap program A of the flash memory 270. Specifically, the microcomputer 260 reads the version byte D indicating the version number of the main program (S21), and when the version number is '0', it is determined that the main program C of the flash memory 270 has not been completed, and the microcomputer 260 performs the downloading program B which has been stored in the flash memory 270, for thereby automatically being switched into a downloading mode without any key input by the user (S23).

Here, since a downloading operation according to the second embodiment is the same as S11 to S18 in the process according to the first embodiment of the present invention, the detail description will be omitted.

Next, if the version number is not '0' after recognizing the version number (S22) is determined that the main program C stored in the flash memory 270 is complete, and the microcomputer 260 performs the system initialization in accordance with the main program C (S24), for thus various functions required by the user may be carried out.

As described above, the bootstrap and the downloading programs must be separately stored in the flash memory 270 in order to perform the automatic downloading operation according to the second embodiment of the present invention.

Further, to make provision for the case where an abnormal program is written due to various possible situations which may occur during the downloading operation of the main program, there is provided a downloading apparatus for a digital broadcast receiver according to a third embodiment of the present invention which further includes a second flash memory 300 for backing up the flash memory 270 wherein the downloading has been completed.

In a downloading method of a digital broadcast receiver according to the third embodiment of the present invention, after the steps S10 to S17 have been carried out, there is included an additional step wherein the second flash memory 300 backs up the new program which has been updated in the flash memory 270.

Thus, when any abnormal state occurs during the downloading operation, the system is rerun and if the version number which is written in the version byte domain D of the flash memory 270 is '0' if indicates that the main program C stored in the flash memory 270 is incomplete. Thus, the program which has been backed up in the second flash memory 300 is processed, for thereby operation a re-download of the new program in accordance with the requirement of the user or performing various functions.

As described above, the downloading apparatus for the digital broadcast receiver according to the present invention has several advantages.

First, since it is possible to update a version by receiving the new main program of the microcomputer through the broadcast and thus it is possible to provide a new version program whenever needed, the user may continuously receiver new services after purchasing a product.

In addition, according to the invention, the bootstrap operation is firstly operated when power is applied, for thus when an incomplete main program is stored due to various situations, the downloading mode is automatically selected and a new program may be downloaded or a program which has been backed up may be processed.

It will be apparent to those skilled in the art that various modifications and variations can be made in the downloading apparatus and a method thereof for the digital broadcast receiver of the present invention without departing from the spirit or scope of the invention. Thus, it is intended that the present invention cover the modifications and variations of this invention provided they come within the scope of the appended claims and their equivalents.

What is claimed is:

1. A downloading apparatus for a broadcast receiver, comprising:
   a receiver which receives a broadcast signal having a video program signal and a control information signal;
   a storage element which stores a control program, the control program controlling the operation of a video program corresponding to the video program signal, wherein the store element further comprises:
      a random access memory (RAM) for temporarily storing a downloaded control program, and
      a non-volatile random access memory (NVRAM), including:
         a first domain,
         a second domain for storing a control program,
         a third domain for storing a downloading program for controlling a download procedure, wherein during the download procedure the control program stored in the second domain is updated, and
         a fourth domain for storing a bootstrap program, wherein the bootstrap program controls an initial boot routine,
      wherein the first domain stores a version number of the control program stored in the second domain when the control program is valid and further stores a predetermined number when the download procedure for updating the control program in the second domain was suspended due to a signal transmission error, and wherein the initial boot routine includes checking whether or not a value stored in the first domain is the predetermined number and, when the value is the predetermined number, automatically updating the control program by restarting the downloading program stored in the non-volatile random access memory, predetermined number indicating that the control program which had been stored in the second domain has been deleted, and that a new control program is being downloaded; and
   a micro-controller for replacing the control program stored in the second domain with the downloaded control program temporarily stored in the random access memory based on the control information signal and the version number of the control program.

2. The apparatus according to claim 1, wherein the broadcast signal includes a packet identifier (PID) to identify a type of information of the broadcast signal.

3. The apparatus according to claim 1, further comprising a signal processor which separates the control information signal from the broadcast signal.

4. A method for downloading a control program from a broadcast signal in a digital broadcast receiver, comprising:
   starting a downloading program stored in a non-volatile random access memory;
   downloading a new control program from the broadcast signal, and then temporarily storing the downloaded new control program in a volatile random access memory;
   writing a predetermined value in a version domain of the non-volatile random access memory;
   deleting a control program stored in the non-volatile random access memory;
   writing the downloaded new control program stored in the volatile random access memory in the non-volatile random access memory;
   writing a version number corresponding to the downloaded new control program in the version domain of the non-volatile random access memory;
   rebooting the digital broadcast receiver;
   examining the version domain of the non-volatile random access memory during an initial boot routine controlled by a bootstrap program; and
   restarting the downloading program stored in the non-volatile random access memory for receiving the control program when the examined version domain of the non-volatile random access memory includes the predetermined value when the downloading new control program for updating the control program was suspended due to a signal transmission error, and starting the control program stored in the non-volatile random access memory when the examined version domain of the non-volatile random access memory falls to include the predetermined value,
   wherein the predetermined number indicates that the control program which has been stored in the non-volatile random access memory has been deleted and the new control program is being downloaded.

5. The method according to claim 4, wherein the non-volatile random access memory includes:
   a version domain storing the version number and the predetermined value; and
   a control program domain storing the control program.

* * * * *